(12) United States Patent
Metaxas et al.

(10) Patent No.: US 8,121,347 B2
(45) Date of Patent: Feb. 21, 2012

(54) SYSTEM AND METHOD FOR DETECTING AND TRACKING FEATURES IN IMAGES

(75) Inventors: Dimitris Metaxas, North Brunswick, NJ (US); Atul Kanaujia, Piscataway, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 1100 days.

(21) Appl. No.: 11/954,786

(22) Filed: Dec. 12, 2007

(65) Prior Publication Data

US 2008/0187174 A1 Aug. 7, 2008

Related U.S. Application Data

(60) Provisional application No. 60/874,451, filed on Dec. 12, 2006.

(51) Int. Cl.
*G06K 9/46* (2006.01)
(52) U.S. Cl. ......... 382/103; 382/118; 382/203; 382/215
(58) Field of Classification Search .................. 382/103, 382/118, 190, 203, 215
See application file for complete search history.

(56) References Cited

U.S. PATENT DOCUMENTS

| | | | | |
|---|---|---|---|---|
| 5,999,651 | A * | 12/1999 | Chang et al. | 382/215 |
| 6,259,802 | B1 * | 7/2001 | Jolly et al. | 382/103 |
| 2001/0026351 | A1 | 10/2001 | Gao et al. | |
| 2005/0147303 | A1 * | 7/2005 | Zhou et al. | 382/190 |
| 2005/0238233 | A1 * | 10/2005 | Mulet Parada et al. | 382/199 |
| 2006/0155398 | A1 | 7/2006 | Hoffberg et al. | |
| 2006/0200259 | A1 | 9/2006 | Hoffberg et al. | |
| 2006/0257051 | A1 | 11/2006 | Zavadsky et al. | |
| 2006/0267781 | A1 | 11/2006 | Coulter | |
| 2007/0031003 | A1 * | 2/2007 | Cremers | 382/103 |

OTHER PUBLICATIONS

Hu et al. "Manifold Based Analysis of Facial Expression." Conference on Computer Vision and Pattern Recognition Workshop, Jun. 27, 2004, 7 pages.*
Zhou et al. "An Information Fusion Framework for Robust Shape Tracking." IEEE Transactions on Pattern Analysis and Machine Intelligence, vol. 27, No. 1, Jan. 2005, pp. 115-129.*
Li et al. "View-based clustering of object appearances based on independent subspace analysis." Eighth IEEE International Conference on Computer Vision, vol. 2, Jul. 2001, pp. 295-300.*
Cootes, "An Introduction to Active Shape Models," Oxford Universit Press, (2000), (26 pages).

(Continued)

*Primary Examiner* — Jon Chang
(74) *Attorney, Agent, or Firm* — McCarter & English, LLP

(57) ABSTRACT

A system and method for tracking features, e.g., facial features, is provided, which allows for the tracking of features which move in a series of images and whose shape changes nonlinearly due to perspective projection and complex 3D movements. A training set of images is processed to produce clustered shape subspaces corresponding to the set of images, such that non-linear shape manifolds in the images are represented as piecewise, overlapping linear surfaces that are clustered according to similarities in perspectives. A landmark-based training algorithm (e.g., ASM) is applied to the clustered shape subspaces to train a model of the clustered shape subspaces and to create training data. A subsequent image is processed using the training data to identify features in the target image by creating an initial shape, superimposing the initial shape on the target image, and then iteratively deforming the shape in accordance with the model until a final shape is produced corresponding to a feature in the target image.

20 Claims, 15 Drawing Sheets

OTHER PUBLICATIONS

Sozou, et al., "Non-Linear Point Distribution Modelling Using a Multi-Layer Perceptron," Image and Vision Computing 15 (1997), pp. 457-463 (7 pages).

Cootes, et al., "A Mixture Model for Representing Shape Variation," Image and Vision Computing 17 (1999), pp. 567-573 (7 pages).

Murase, et al., "Visual Learning and Recognition of 3-D Objects from Appearance," International Journal of Computer Vision, 14, pp. 5-24 (1995) (20 pages).

Gong, et al., "Learning to Asscoiate Faces Across Views in Vector Space of Similarities to Properties," British Machine Vision Conference (1998) (10 pages).

Romdhani, et al., "A Multi-View Nonlinear Active Shape Model Using Kernel PCA," British Machine Vision Conference, pp. 483-492 (1999) (10 pages).

Zhou, et al., "A Bayesian Mixuture Model for Multi-View Face Alignment," Proceedings of the 2005 IEEE Computer Socieity Conference on Computer Vision and Pattern Recognition (2005) (6 pages).

Cootes, et al., "View-Based Active Appearance Models," Image and Vision Computing 20 (2002), pp. 657-664 (8 pages).

Edwards, et al., "Learning to Indentify and Track Faces in Image Sequences," British Machine Vision Conference (1997) (6 pages).

Heap, et et al., "Improving Specificity in PDMs Using a Hierarchial Approach," British Machine Vision Conference (1997) (10 pages).

Bregler, et al., "Surface Learning With Applications to Lipreading," Advances in Neural Information Processing Systems 9 (1994) (9 pages).

Goodall, "Procrustes Methods in the Statistical Analysis of Shape," Journal of the Royal Statistical Socieyt, vol. 53, No. 21, pp. 285-339 (1991) (55 pages).

Tomasi, et al., "Shape and Motion from Image Streams: A Factorization Method—Part 3 Detection and Tracking of Point Features," Technical Report CMU-CS-91-132, Apr. 1991 (22 pages).

PCT Patent Application Serial No. PCT/US07/87197, entitled "System and Method for Detecting and Tracking Features in Images," filed Dec. 12, 2007 (35 pages).

International Search Report of the International Searching Authority mailed Apr. 16, 2008, issued in connection with International Patent Appln. No. PCT/US07/87197 (4 pages).

Written Opinion of the International Searching Authority mailed Apr. 16, 2008, issued in connection with International Patent Appln. No. PCT/US07/87197 (4 pages).

* cited by examiner

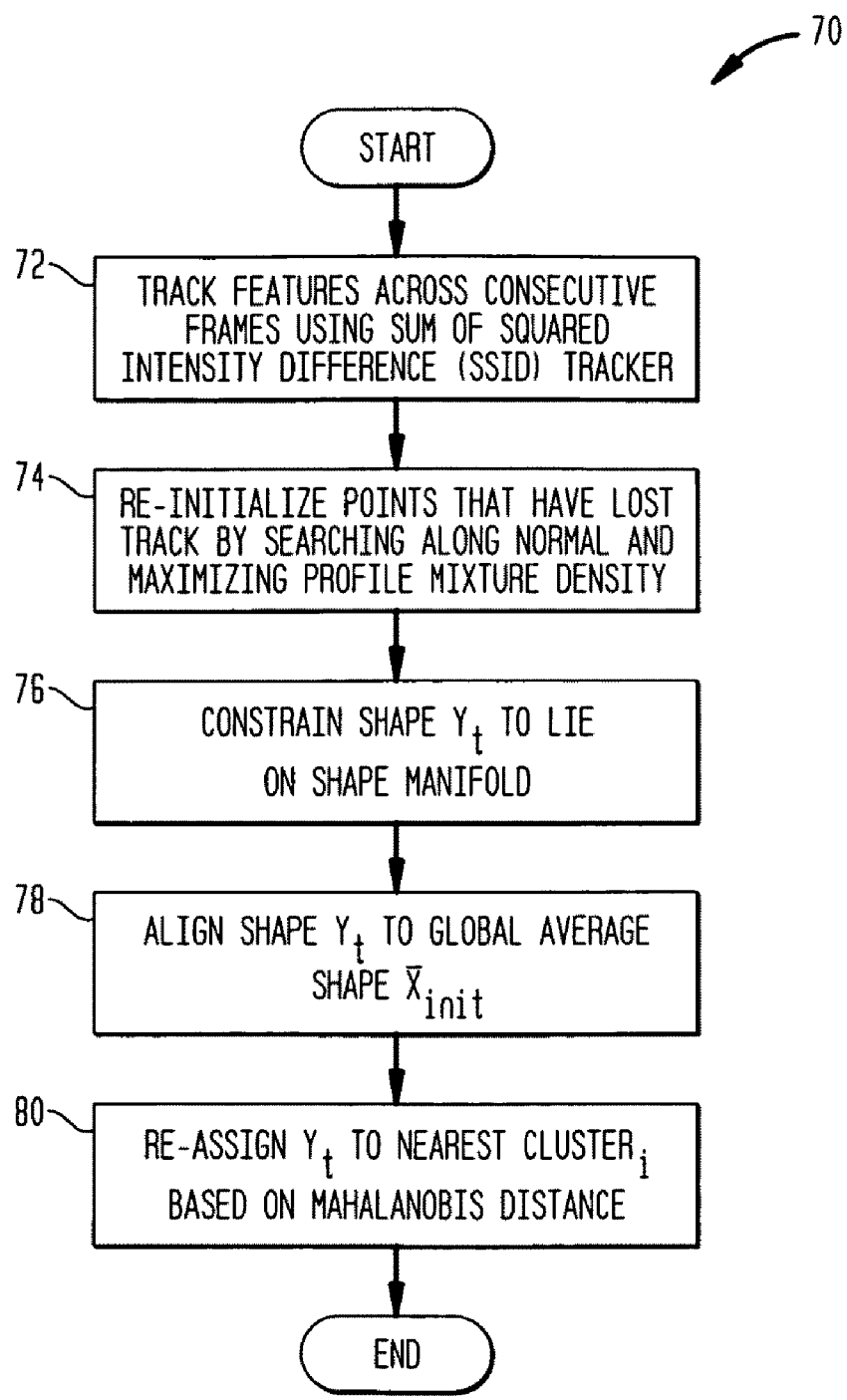

1.668°, INIT   17.97°, ITER. 1   27.95°, ITER. 20   45.29°, ITER. 40   55.53°, ITER. 47

SYSTEM AND METHOD FOR DETECTING AND TRACKING FEATURES IN IMAGES

RELATED APPLICATIONS

The present application claims the benefit of U.S. Provisional Application Ser. No. 60/874,451 filed Dec. 12, 2006, the entire disclosure of which is expressly incorporated herein by reference.

GOVERNMENT RIGHTS

The present invention has been made under a contract by the Homeland Security Advanced Research Projects Agency under Contract No. ONR N000173-05-G015, and the government may have certain rights to the subject invention.

BACKGROUND OF THE INVENTION

1. Field of the Invention

The present invention relates generally to the field of computer vision. More specifically, the present invention relates to a system and method for detecting features, e.g., facial features, in images, and tracking such features over time in a series of images.

2. Related Art

A subject of interest in the computer vision field relates to the identification and/or tracking of deformable shapes or objects across a series of images. This subject has many applications in biometrics, facial expression analysis, and synthesis. Accurate reconstruction and tracking of deformable objects in images requires well-defined delineation of the object boundaries across multiple viewpoints.

Landmark-based deformable models, such as Active Shape Models (ASMs), allow for object shape detection and delineation in 2-dimensional (2D) images. ASMs are statistical models of the shapes of objects which are iteratively deformed to fit an example of an object in an image. Deformation of the models is limited to shapes provided in a training set of examples. The shape of the object is represented by a set of points, and the goal of the ASM algorithm is to match the model to an input image. ASMs detect features in an image by combining shape and appearance information from the observed image data, and uses a learned statistical shape distribution for a given class of objects to align the contours of shapes to the detected features in the observed images.

A major limitation of landmark-based deformable models is that they ignore the non-linear geometry of shape manifolds of objects in images viewed from multiple viewpoints, which severely limits the ability of such models to detect and track features across a series of images where there is substantial movement of the features. Such changes can result from movement (e.g., rotation) of the subject and/or the imaging apparatus, which can cause aspect changes in the images. Movement of 3-dimensional (3D) objects causes shapes to vary non-linearly on a hyper-spherical manifold. As a result, during tracking, the shape change is mostly smooth, but in certain cases there may be discontinuities. For example, during rotation of a subject's head to the full facial profile, some of the facial features may be occluded, causing drastic changes in shapes. In addition to shape changes, the correspondences between local 2D structures in an image and the 3D object structures changes for the landmark-based deformable models. The local grey level profiles at these landmarks also exhibit dramatic variations. Further, face shape variations across multiple aspects is different across human subjects. For example, a 30 degree head rotation can produce more distinct variations for faces with raised facial features (e.g., eyes and nose) versus faces with leveled features.

There have been several efforts in the past to represent non-linear shape variations using kernel Principal Component Analysis (PCA) and multi-layer perception. The results from non-linear approaches largely depend on whether all of the shape variations have been adequately represented in the training data. Discontinuities in the shape space may cause these models to generate implausible shapes. Kernel methods suffer from a major drawback in that they must learn pre-image functions for mapping shapes in the feature space to the original space, which is time consuming. Other techniques, such as Active Appearance Models (AAMs) and non-linear projections into eigenspaces, cannot adequately track features in images where the features move across a series of images.

Accordingly, what would be desirable, but has not yet been provided, is a system and method for detecting and tracking features in images, wherein moving features can be accurately detected in the images and tracked over time in a series of images.

SUMMARY OF THE INVENTION

The present invention relates to a system and method for detecting and tracking features in images. The present invention allows features, such as facial features, to be detected in a series of images containing large feature movements (e.g., feature movements caused by aspect changes which could result from motion of the subject and/or motion of an imaging sensor). The present invention can track detected features where there are large variations in shapes and appearances of the features over time, using clustered representations (ire., clustered shape subspaces) of non-linear shape manifolds. The present invention utilizes a trained shape model to constrain detected shapes so that they lie in the cluster-based representation of the non-linear shape model.

During a training stage, feature shapes from the images are clustered to represent non-linear shape manifolds as clustered shape subspaces containing piecewise, overlapping linear surfaces. A landmark-based training algorithm (e.g., the Active Shape Model algorithm, as adapted herein) is applied to the clustered shape subspaces to create and train a model that can handle large variations in shapes. The invention uses the trained model to identify facial features in a target image by searching for the contours in the clustered shape subspaces using appearance information extracted at each landmark position. The features in the target image are identified by creating an initial shape, superimposing the initial shape on the target image, and then iteratively deforming the shape in accordance with the model until a final shape is produced corresponding to a feature in the target image.

The present invention also allows for the detection and tracking of features when significant 3D rotations and translations of an object occur in a series of images (e.g., in a video sequence), which cause occlusions and non-linearities with respect to how the features change over time. The present invention tracks feature shapes across a sequence of images by traversing the clustered shape subspaces and constraining the shapes to match the clustered shape subspaces. Algorithms for pose angle estimation, detection of head nodding, head movement, and eye blinking based upon the tracked feature shapes are also provided.

BRIEF DESCRIPTION OF THE DRAWINGS

The foregoing features of the invention will be apparent from the following Detailed Description of the Invention, taken in connection with the accompanying drawings, in which:

FIG. 4 is a flowchart showing processing steps according to the present invention for tracking facial features across multiple image frames;

DETAILED DESCRIPTION OF THE INVENTION

The present invention relates to a system and method for detecting features, e.g., facial features, in images, and tracking such features across a series of images (e.g., in a video sequence). The present invention allows for the detection and tracking of features where large variations in the shapes of the features may occur due to wide aspect changes caused by the motion of the subject and/or motion of the imaging device. The present invention models non-linear shape manifolds as clustered shape subspaces containing piecewise, overlapping linear surfaces. A complex, non-linear shape subspace can be approximated as a combination of multiple smaller linear subspaces. Each subspace defines a hyper-ellipsoid within which a shape instance is constrained to lie. A landmark-based training algorithm is applied to the clustered shape subspaces to train a piecewise linear model for the shape manifold. For each of the clustered shape subspaces, appearance models for each of the landmarks are learned as intensity profiles. The clusters for the appearance models are the same as shape clusters due to high correlation between the viewpoint from which an object is observed and a landmark appearance.

After training of the model, features in a target image can be identified by creating an initial shape, superimposing the initial shape on the target image, and then iteratively deforming the shape in accordance with the model until a final shape is obtained that aligns with features in the target image. The search iteratively modifies an initial shape by searching along the normals of the landmark points and simultaneously constraining the shape in accordance with the model. The path between the source shape and the target shape is traversed by searching across the clustered shape subspaces.

Figure 1:
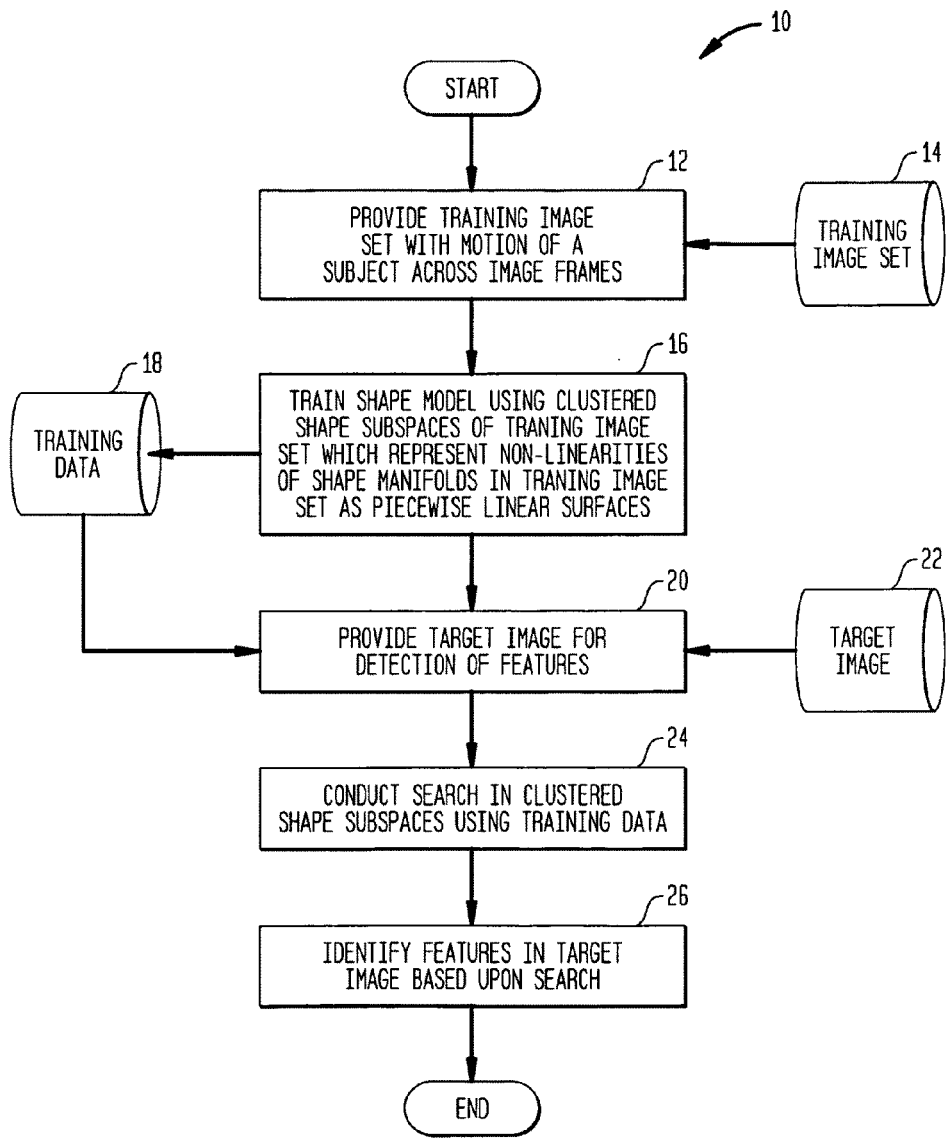
FIG. 1 is flowchart showing processing steps according to the present invention for tracking features in images.

FIG. 1 is a flowchart showing processing steps according to the present invention, indicated generally at 10, for identifying features in images. In step 12, a set of training images 14, having motion of features in a series of images (e.g., changes in the perspective of the subject over image frames due to motion of the subject and/or motion of an imaging sensor), is provided. As shown in FIGS. 5A-5D, the training images are clustered into clustered shape subspaces according to similarities in their image projections (e.g., similarities in perspective views). In step 16, an Active Shape Model (ASM) algorithm is applied to the clustered shape subspaces of the images in the training image set, which contain piecewise linear surface approximations of non-linearities in shape manifolds in the training images 14, to create and train a model. The training data 18 generated by the ASM is utilized for future tracking of shapes in a target image where motion of the subject with respect to the image frame occurs (e.g., perspective and/or aspect changes in the target image). A complex, non-linear region of a shape manifold is approximated as a combination of multiple smaller linear subspaces, such that each subspace defines a hyper-ellipsoid within which a shape instance is constrained to lie. This piecewise linear approximation of non-linear shape manifolds in the training image set allows a subsequent ASM search (discussed below) to track facial features in the target image set where perspective and/or aspect changes have occurred by creating an initial shape (superimposed on the target image) that is iteratively deformed to create a shape which best fits the facial features in the target image. The search requires modeling and synthesis of paths between starting and ending shapes which lie on non-linear manifolds of the subsequent image, so as to track features of the non-linear manifolds.

Figure 6:
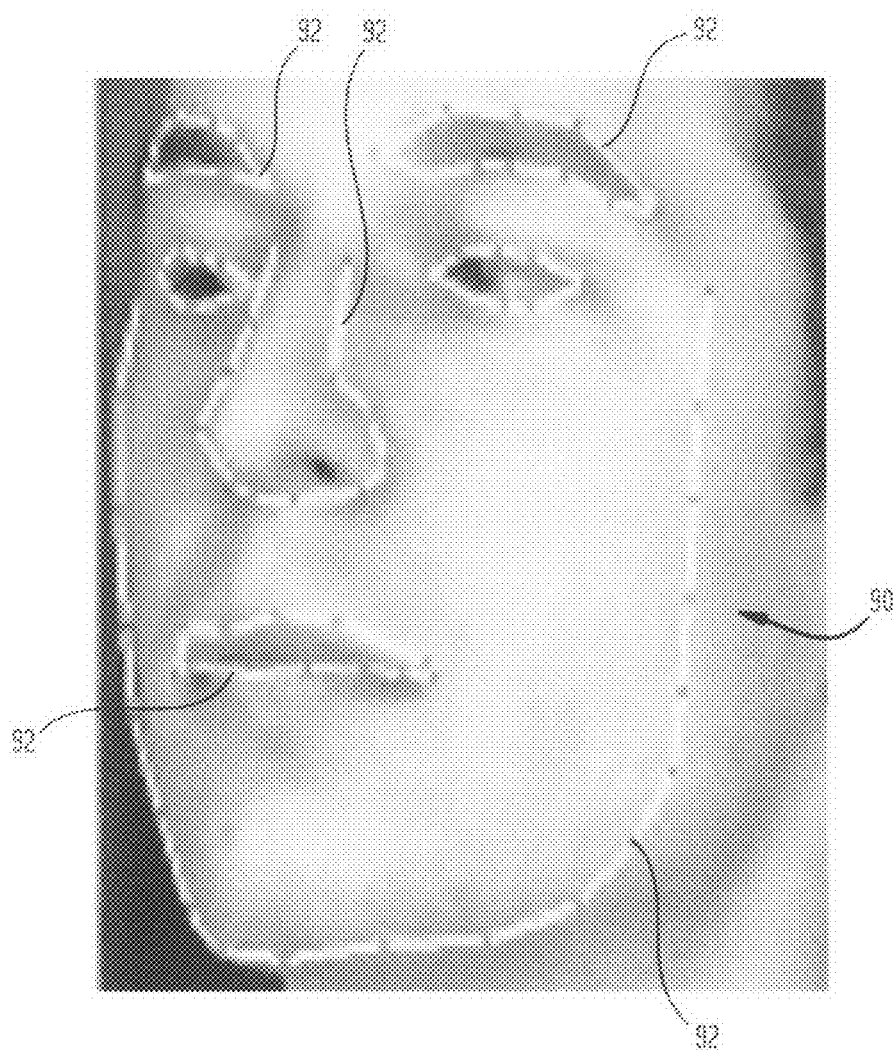
FIG. 6 is a photograph of a target image and identification by the present invention of facial features in the image.

After completion of training, a target image 22 is provided in step 20, in which detection of features (e.g., facial features) is desired. In step 24, an initial shape is created and is projected onto the target image, and an ASM search is conducted in the cluster shape subspaces using the training data 18. The search iteratively modifies (deforms) the initial shape by searching along the normals of landmark points in the target image and by simultaneously constraining the modification of the shape so that it matches the clustered shape subspaces corresponding to the 3D shape manifold. The path (progression) between the initial shape and the final modified shape is determined by searching across multiple subspaces which approximate the non-linear shape surface. Tracking of features can be successfully leveraged by taking advantage of the heterogeneous nature of shape variations due to pose changes, thereby causing these subspaces to overlap. The extent of overlap can be improved by having a fixed minimum mahalanobis radius for each subspace and by including points across the cluster boundaries to learn the principal subspace. In step 26, after deformation of the shape as constrained by the ASM search and training data, the features in the target image are identified by outlining such features in the image. An example is shown in FIG. 6, wherein facial features in a target image 90 are indicated by the shape lines 92 projected onto the image 90.

Figure 2:
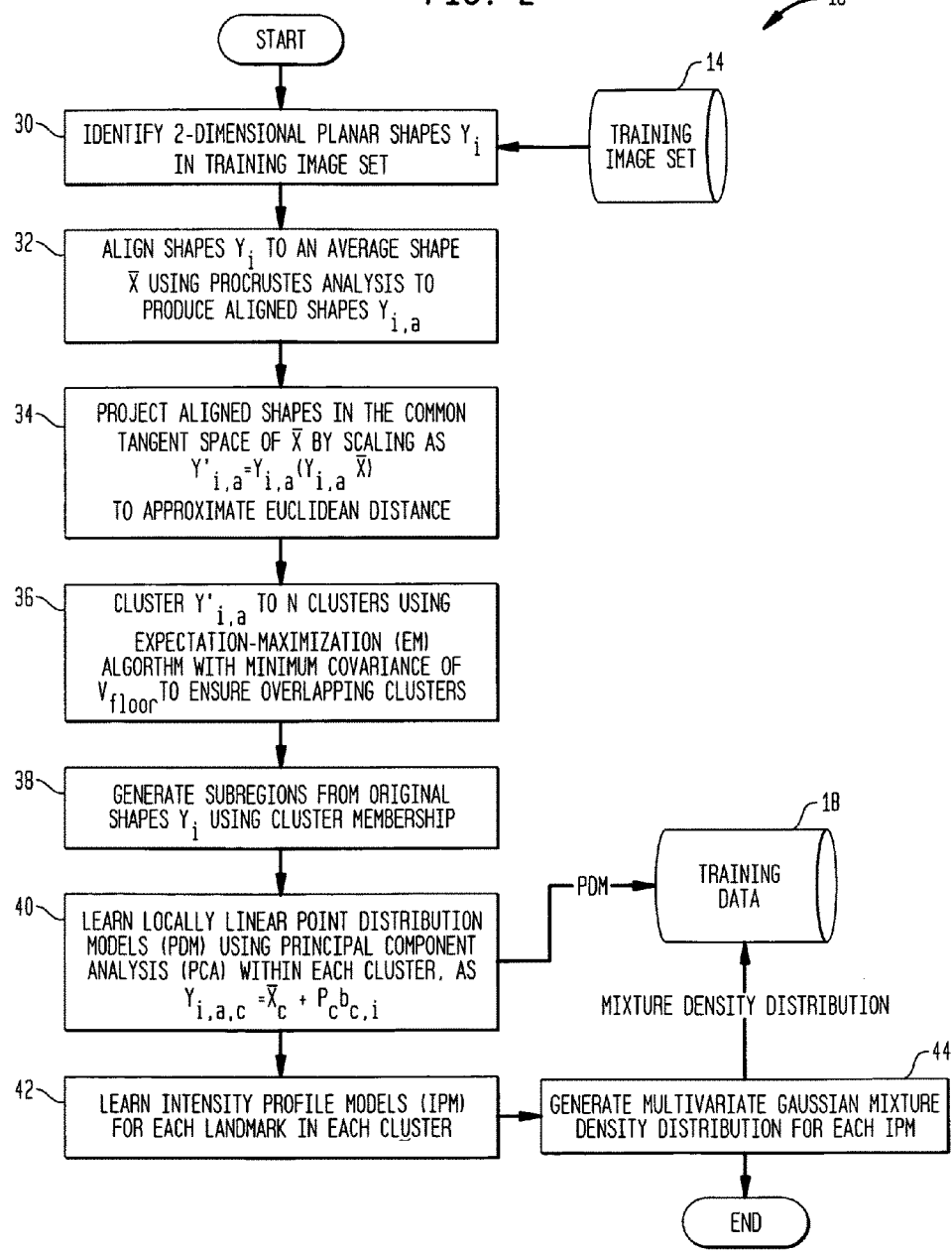
FIG. 2 is a flowchart showing the model training steps of the present invention in greater detail.

FIG. 2 is a flowchart showing step 16 of FIG. 1 in greater detail. In step 30, 2D planar shapes $Y_i$ are identified in the training image set 14. In step 32, the shapes $Y_i$ are aligned to an average shape $\overline{X}$ of the training image set 14 using Procrustes analysis (a known statistical shape analysis technique for analyzing the distribution of a set of shapes) to produce aligned shapes $Y_{i,a}$. The aligned shapes obtained from Procrustes analysis lie on a hyper-sphere. In step 34, the aligned shapes $Y_{i,a}$ are projected in the common (global) tangent space $T_s$ of the average shape $\overline{X}$, such that $Y'_{i,a}=Y_{i,a}(Y_{i,a}\overline{X})$. The tangent space $T_s$ is a hyper-plane normal to the mean vector passing through it. The tangent space is a linear approximation of the general shape space so that the Procrustes distance can be approximated as a Euclidean distance between the planar shapes.

In step 36, the projected, aligned shapes $Y'_{i,a}$ are clustered to N clusters using the known Expectation-Maximization (EM) algorithm with a minimum covariance of $V_{floor}$ to ensure that there are overlapping clusters. The cluster analysis of shape is done in the global tangent space. A generative multivariate Gaussian mixture distribution is assumed for both the global shapes and the intensity profile models (IPMs), discussed below. The conditional density of the shape $S_i$ belonging to an N-class model p($S_i$|Cluster)=

$$\sum_{j=1}^{N} \gamma_j (2\pi)^{-(\frac{N}{2})} \|C_j\|^{-1/2} \exp \tag{1}$$

$$\left\{-\frac{1}{2}(S_i - (\mu_j + P_j b_j))^T C_j^{-1}(S_i - (\mu_j + P_j b_j))\right\}$$

In Equation 1 above, a diagonal covariance matrix $C_j$ is assumed. $\gamma_j$ are the cluster weights, and ($\mu_j$, $P_j$, $b_j$) are the mean, eigen-matrix, and eigen-coefficients respectively for the principle subspace defined for each cluster. It is important that the adjacent clusters overlap sufficiently in order to ensure switching between subspaces during subsequent image searching and tracking. The amount of overlap can be controlled by variance flooring during execution of the EM algorithm to cluster the data set. Setting the minimum variance to the fixed value $V_{floor}$ during the maximization step enables clusters to have larger expanse. Eventually, the mahalanobis distance is used as a classification cost. The number of clusters also affects the degree of overlap. Subspace overlap can be ensured by using boundary points between adjacent clusters to learn the subspace for both the clusters. These points can be obtained as nearest to the cluster center, but not belonging to that cluster.

In step 40, locally linear Point Distribution Models (PDM) are learned using Principal Component Analysis (PCA) within each cluster, such that $Y_{i,a,c}=\overline{X}_c+P_c b_{c,i}$. For each of the N clusters, a locally linear PDM is learned using PCA and using eigenvectors to capture significant variance in the cluster (e.g., 98%). Clustering in the global tangent space is used to decide class membership of the original shapes. Consequently, the shape non-linearities are preserved across the clusters. An independent PDM is learned within each cluster. The present invention thus allows more accurate modeling of the non-linear shape manifold using piecewise, linear hyper-ellipsoid subspaces. The intensity profiles for the landmark points also exhibit large variation when trained over multiple head poses. The change in face aspects causes the profiles to vary considerably for the feature points that are occluded. The PDMs learned in step 40 are stored in the ASM training data 18.

In step 42, Intensity Profile Models (IPMs) are learned for each landmark in each cluster. Then, in step 44, multivariate Gaussian mixture density distribution is generated for each fPM, and stored in the ASM training data 18. The multivariate Gaussian mixture distribution is learned in order to capture variations that cannot be learned using a single PCA model.

Figure 3:
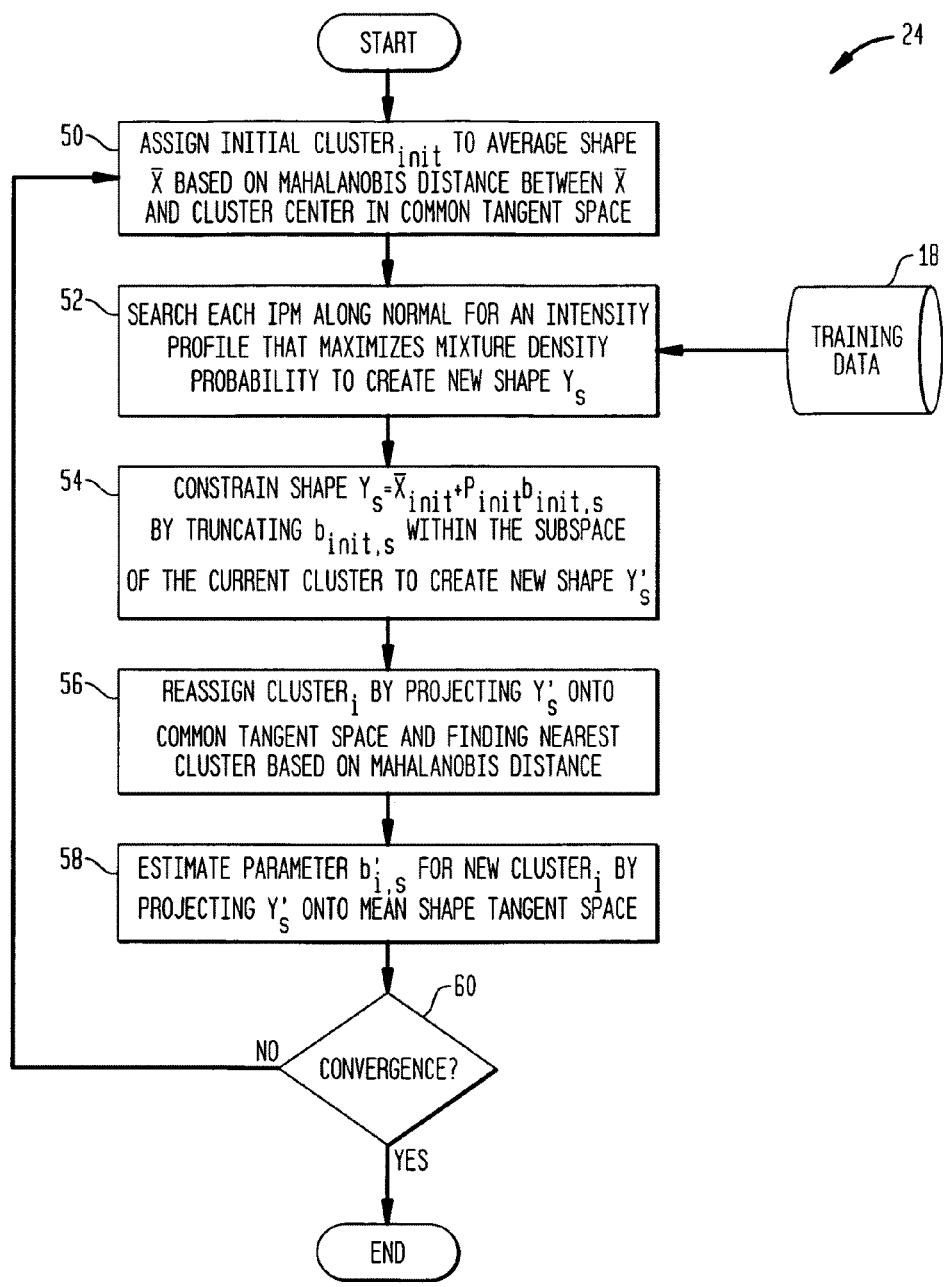
FIG. 3 is a flowchart showing the shape searching steps of the present invention in greater detail.
Figure 5A:
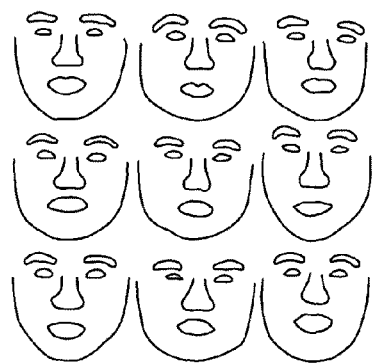
FIGS. 5A-5D are depictions of clustered sets of training images utilized to train the present invention.
Figure 5B:
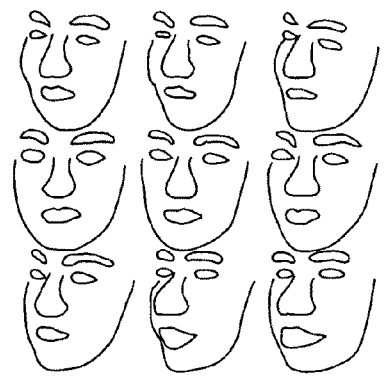
Figure 5C:
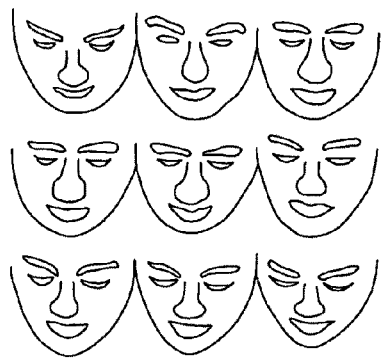
Figure 5D:
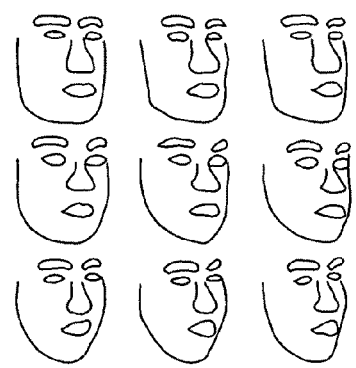

FIG. 3 is a flowchart showing step 24 of FIG. 1 in greater detail. In step 50, an initial cluster Cluster$_{init}$ is assigned to the average shape $\overline{X}$, based on the mahalanobis distance between $\overline{X}$ and the cluster centers in the common tangent space $T_s$. In step 52, each IPM in the ASM training data 18 is searched along the normal for an intensity profile that maximizes the mixture density probability to create a new shape $Y_s$. The search is done over 4 levels of a Gaussian image pyramid. Conventional ASM uses an Alternating Optimization (AO) technique to fit the shape by searching for the best matched profile along the normal followed by constraining the shape to lie within the learned subspace. The initial average shape is assumed to be in a region near to the target object. Robust Viola-Jones face detection techniques can be used to extract a bounding box around a face in the target image set 22, and its dimensions can be used to initialize the search shape. The face detector has 99% detection rate for faces with off-plane and in-plane rotation angles of 30 degrees.

In step 54, the shape $Y_s$ is deformed to create a new shape $Y'_s$ by constraining the shape $Y_s$ so that $Y_s=\overline{X}_{init}+P_{init}b_{init,s}$ and truncating $b_{init,s}$ within the subspace of the current cluster. In step 56, a Cluster$_i$ is re-assigned by projecting $Y'_s$ onto the common tangent space and finding the nearest cluster based on the mahalanobis distance between the average shape $\overline{X}$ and the cluster centers in the common tangent space. In step 58, the parameter is $b_{init,s}$ estimated for the new Cluster$_i$ by projecting $Y'_s$ onto the mean shape tangent space. In step 60, a determination is made as to whether convergence exists between the new shape IPMs of $Y'_s$ and the intensity profiles extracted from the current image for each of the landmark points. The shape search is assumed to be converged if 85% of the landmark points don't move along the normal during the search. If a positive determination is made, processing ends. Otherwise, steps 50-60 are repeated so that additional shape searches can be performed. Thus, as shown in FIG. 3, the image search is initiated at the top-most level of the Gaussian pyramid by searching along the normals and maximizing the mixture probability density of the intensity gradient along the profile. The model update step-shifts the shape to the current cluster subspace by truncating the eigen coefficients to lie within the allowable variance as $\pm 2\sqrt{\lambda_i}$. The shape is re-assigned to the nearest cluster based on the mahalanobis distance, and the shape coefficients are re-computed if the current subspace is different from the previous. This allows the shape to be deformed to a best "fit" indicative of facial features in the target image.

FIG. 4 is a flowchart showing processing steps according to the present invention, indicated generally at 70, for tracking facial features across consecutive frames of a target image set. Running ASM at every frame is computationally expensive, and causes feature points to jitter strongly. The steps shown in FIG. 4 alleviate this problem by tracking features using a Sum of Squared Intensity Difference (SSID) tracker across consecutive frames, in step 72. The SSI) tracker is a method for registering two images which computes the displacement of the feature by minimizing the intensity matching cost, computed over a fixed sized window around the feature. Over a small inter-frame motion, a linear translation model can be accurately assumed. For an intensity surface at image location I($x_i$, $y_i$, $t_k$), the tracker estimates the displacement vector $d=(\partial x_i, \partial y_i)$ from new image $I(x_i+\partial x, y_i+\partial y, t_{k+1})$ by minimizing the residual error over a window W around $(x_i, y_i)$:

$$\int_W [I(x_i+\delta x, y_i+\delta y, t_{k+1}) - g \cdot d - I(x_i, y_i, t_k)] dW \qquad (2)$$

The inter-frame image warping model assumes that for small displacements of intensity surface of the image window W, the horizontal and vertical displacement of the surface at a point $(x_i, y_i)$ is a function of gradient vector g at that point.

In step 74, points which have lost track are re-initialized by searching along the normal and maximizing the profile mixture density. This alleviates tracking losses due to blurring or illumination changes. In step 76, at every frame, the shape $Y_t$ obtained from tracking (i.e., created through constrained deformation) is ensured to be a plausible shape by constraining the shape to lie on the shape manifold. Then, in steps 78-80, the new shape $Y_t$ is aligned to the global average shape $X_{init}$ and re-assigned to the nearest Clusters based on the mahalanobis distance. The new shape $Y_t$ is constrained to the subspace of the assigned Cluster$_i$. This ensures smooth switching between the overlapping subspaces that represent the non-linear shape manifold.

FIGS. 5A-5D show a sample training image set utilized by the present invention to train the landmark-based search algorithm. As can be seen, the images are clustered according to similarities in perspectives. The cluster in FIG. 5A contains primarily frontal poses, whereas the cluster in FIG. 5D contains poses where the subject's head is rotated to the right.

As mentioned above, shown in FIG. 6 is the result of facial feature identification achieved by the present invention, in a target image 90 of a subject's head. The head has been rotated to the left. As can be seen, the present invention accurately tracks the subject's facial features through head rotation, and delineates the facial features using superimposed lines 92.

Figure 7A:
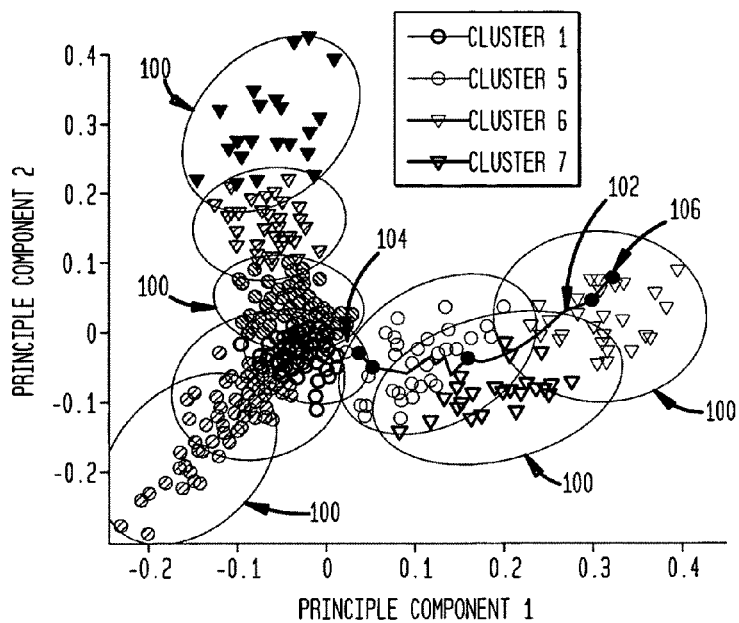
FIG. 7A is a graph showing principal component analysis (PCA) performed by the present invention to cluster shape spaces into related clusters, as well as a sample search path for fitting feature shapes.

FIG. 7A shows sample overlapping clusters (subspaces) generated by the present invention using Principle Component Analysis (PCA) during the training phase discussed above in connection with FIG. 2. Representative Clusters 1 and 5-7 are shown, as well as other clusters (unlabeled). The clusters are indicated by the circles 100. A cluster of images corresponding to frontal poses is shown as Cluster 1 (in the center of the graph). A sample iterative ASM search path for guiding deformation (discussed above in connection with FIG. 3) is graphically illustrated by the line 102. The initial shape is shown at point 104 of the graph, and the final deformed shape is shown 106. The final deformed shape represents the best "fit" shape indicative of facial features in a target image. The initial shape thus deforms "through" the shapes of the various clusters shown in the graph, to produce the final shape indicative of facial features in the target image. The other clusters shown in the graph represent right, left, and downward movement of the subject's face.

Figure 7B:
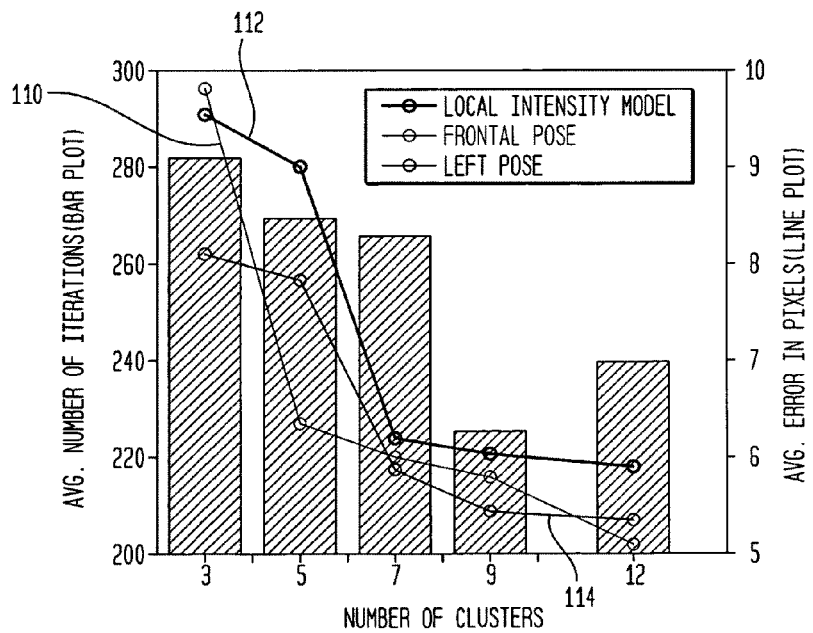
FIG. 7B is a bar graph showing search iteration rates and cluster numbers for various poses and a local intensity model.

It is noted that increasing the number of clusters increases the accuracy of the shape search using the present invention for both frontal and left head pose images. This is due to more accurate representation of the non-linear surface by piecewise linear regions. Also, increasing the number of Gaussian components for the local intensity profile models (IPM) also improves the accuracy. As shown in the bar graph of FIG. 7B, the average ASM iterations (over 4 levels of a Gaussian pyramid) also improves with more Gaussian components (i.e., number of clusters) of the local intensity models, but shows erratic increase for more than 10 components. Plotted are the average number of shape search iterations for versus the number of clusters, as well as results using a frontal pose 110, a local intensity model 112, and a left pose 114.

Figure 8A:
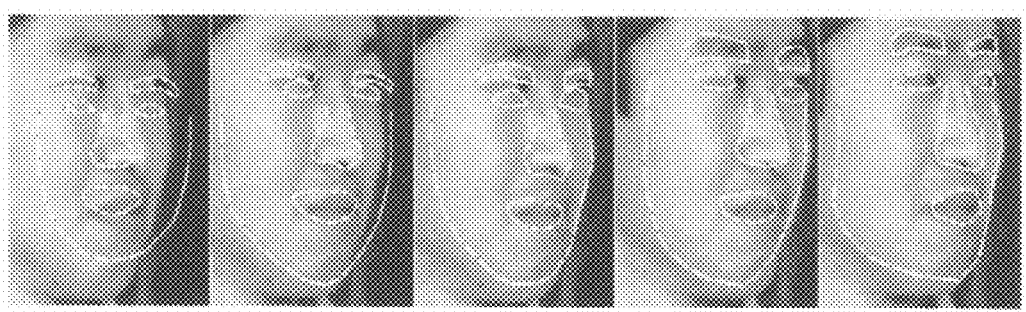
FIGS. 8A-8B show the progression of facial feature detection achieved by the present invention by presenting an initial shape superimposed on an image and iteratively deforming the shape (under constraints) to produce a final shape indicative of facial features.
Figure 8B:
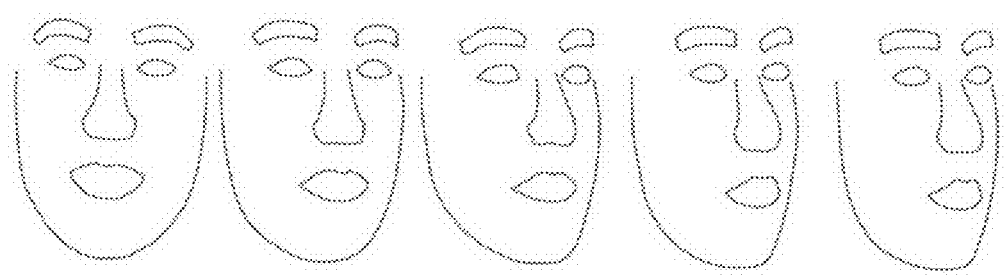

A sample of the tracking process through multiple iterations is shown in FIGS. 8A-8B. FIG. 8A shows shape tracking sequentially projected onto a single target image in which the subject's head has been rotated to the right. FIG. 8B shows only the tracked shapes of FIG. 8A. It can be seen that an initial shape is displayed in the left-most images of FIGS. 8A-8B, and iteratively deformed to the final shape shown in the right-most images. The iterative path shown in FIG. 7A corresponds to the iterative search shown in FIGS. 8A-8B, wherein the subject's head pose has been rotated across multiple image frames.

Figure 9A:
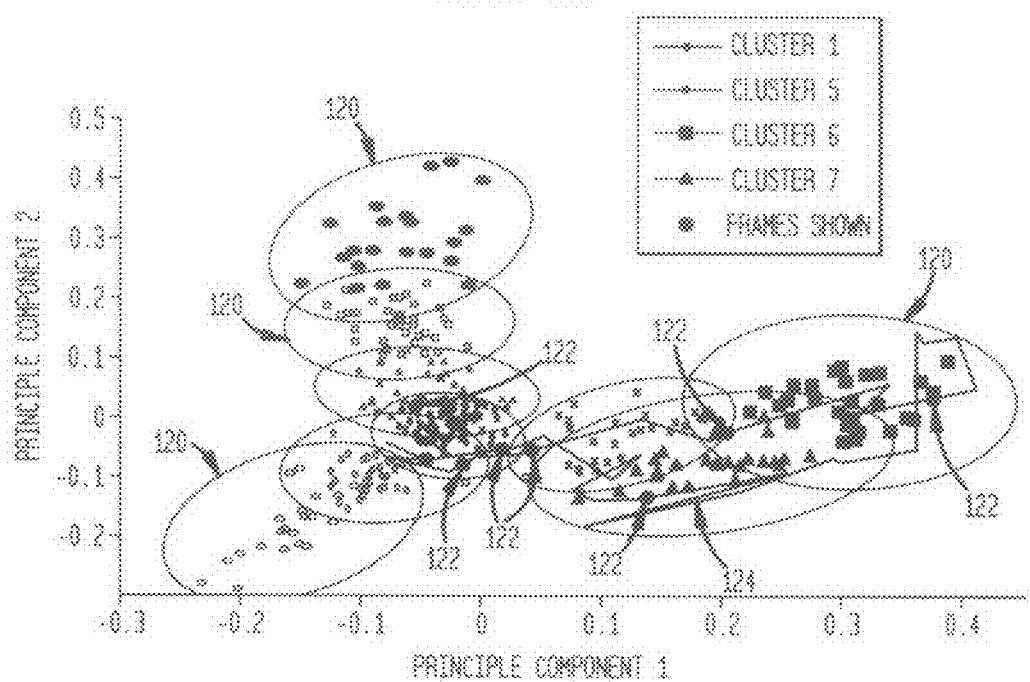
FIG. 9A is a graph showing PCA performed by the present invention in connection with tracking facial features across multiple image frames.
Figure 9B:
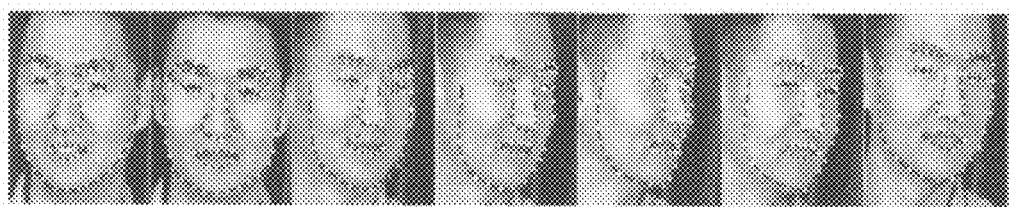
FIG. 9B shows images and feature tracking corresponding to the PCA graph of FIG. 9A.

FIG. 9A is a graph showing overlapping clusters (subspaces) generated by the present invention using Principle Component Analysis (PCA) during tracking facial of features across consecutive frames of a target image set utilizing the processing steps discussed above in connection with FIG. 4. The clusters 120 shown in the graph (including Clusters 1 and 5-7), as well as other clusters (unlabelled) correspond to cluster projections on 2D space of a subject's head through right rotation. The cluster projections on 2D space use 2 principal modes (for visualization) and are bounded by hyper-ellipsoid subspace. The right head rotation causes the shape to vary across the clusters. The circles 122 correspond to the frames shown in FIG. 9B, and the ASM search path is shown by the line 124. The entire search path lies within the subspace spanned by the hyper-ellipsoids. As shown in the images of FIG. 9B, tracking of facial features across multiple perspective changes in the target image set is consistent through each frame. The ASM search path 124 of FIG. 9A corresponds to a tracking sequence when the subject rotates the head from frontal to fill right profile view, and back, as shown in FIG. 9B. FIG. 9A also illustrates the cluster switching as the person rotates the head. The entire path remains within the plausible shape manifold spanned by the 9 hyper-ellipsoid subspaces (clusters) shown in FIG. 9A.

The present invention could be extended to estimate pose angles (e.g., pitch and yaw) of a subject, so as to improve tracking accuracy where there are large head rotations or discontinuities in shape spaces, using a Mixture of Experts (ME) regression modeling technique. Mixture of Experts (ME) provide a modular framework for learning non-linear mappings by clustering the dataset and simultaneously learning function approximators locally in the cluster. The EM algorithm for training ME decouples the optimization task into regressor fitting and multi-way classifier learning. In order to learn PDMs for the shape X, and the corresponding pose angles A, ME formulates the problem as likelihood maximization. The expectation step involves soft clustering:

$$P(\text{Cluster} = i \mid X, A) = \frac{p(A \mid X, F_i(X)) P(\text{Cluster} = i \mid X)}{\sum_j^N p(A \mid X, F_j(X)) P(\text{Cluster} = j \mid X)} \qquad (3)$$

The density P(Cluster=i|X) is the gate distribution for classifying shapes to the $i^{th}$ Cluster. The gate distribution is a multi-category classifier learned using the "softmax" function. The pose angle predictions are done by the function approximators $F_i(X)$ fitted locally to each cluster and are represented using Gaussian distribution $p(A|X, F_i(X))$. The likelihood is a binomial distribution $\Pi_j^N \{p(A|X, F_i(X)) P(\text{Cluster}=i|X)\}^{I(\text{Cluster}=j)}$ where I(Cluster=j) is the indicator function for the class to which shape X belongs. The EM algorithm iteratively learns the parameters by independently maximizing the gate and the regressor distributions in the log likelihood L as the Maximization step:

Log Likelihood (4)

$$\sum_{i}^{M}\sum_{j}^{N} \mathbb{E}[I(\text{Cluster} = j)]\log(P(\text{Cluster} = j \mid X_i)) +$$

$$\mathbb{E}[I(\text{Cluster} = j)]\log(p(A \mid X_i, F_j(X_i)))$$

where E denotes the expected value. In effect the EM algorithm does soft clustering of the shapes X at each step and learns a pose predictor Fj locally in the cluster. Linear regressors with softmax gate distribution can be used. A data set containing large shape variations due to yaw with pose angles varying from −90° to +90° was utilized to test the pose angle estimation algorithm of the present invention. The pose angles for the training set were estimated within an error of ±5° by linear interpolation between the full profile ±90° and frontal 0° poses and assuming constant angular velocity during the head rotation. The use of ME gave an average improvement in the prediction accuracy by 8.34° over a single regressor in the data set. Additional experts usually improves the prediction accuracy, however, they need to be regularized to avoid overfitting the training dataset.

Figure 10A:
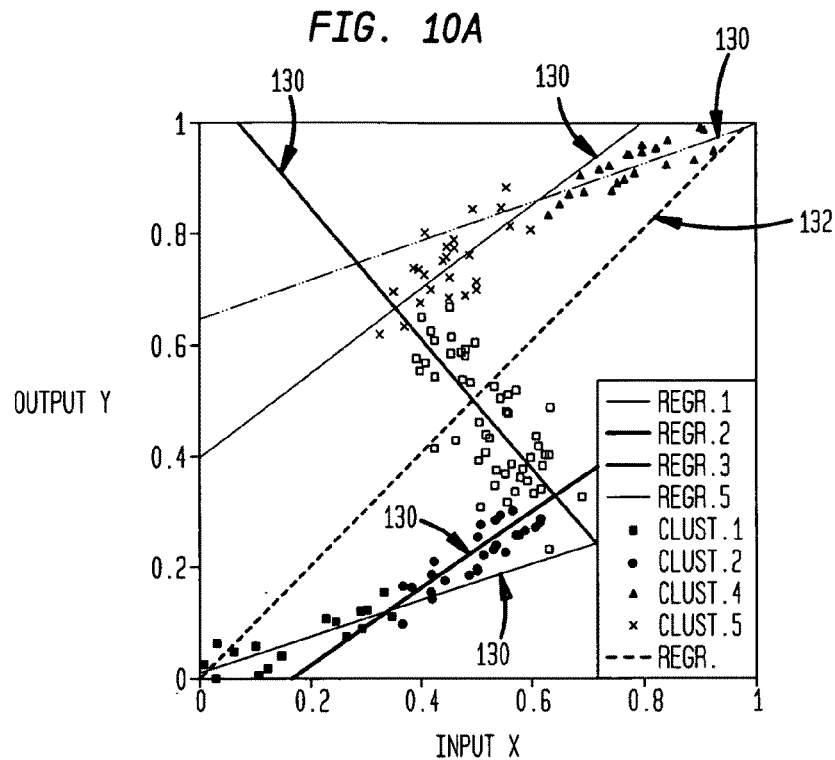
FIGS. 10A-10C are graphs showing Mixture of Experts (ME) analysis performed by the present invention to provide estimates of pose angles of a subjects in images.
Figure 10B:
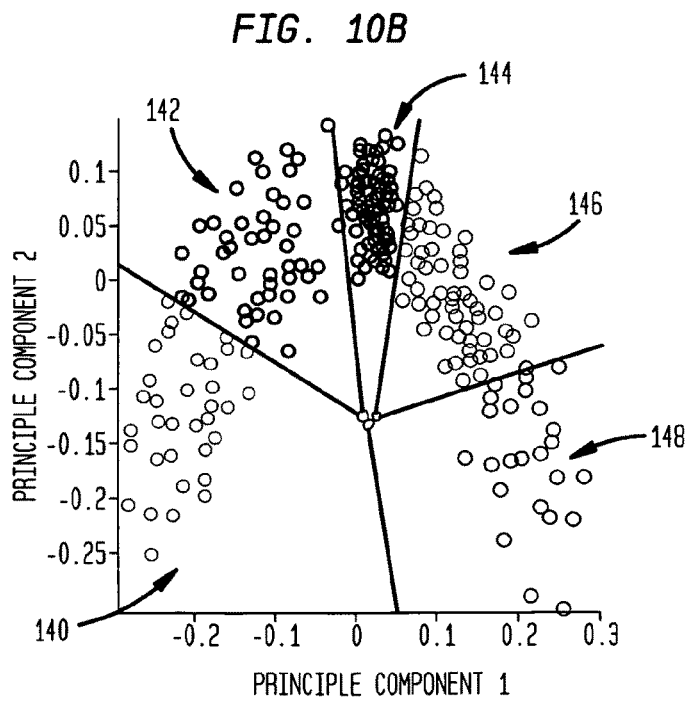
Figure 10C:
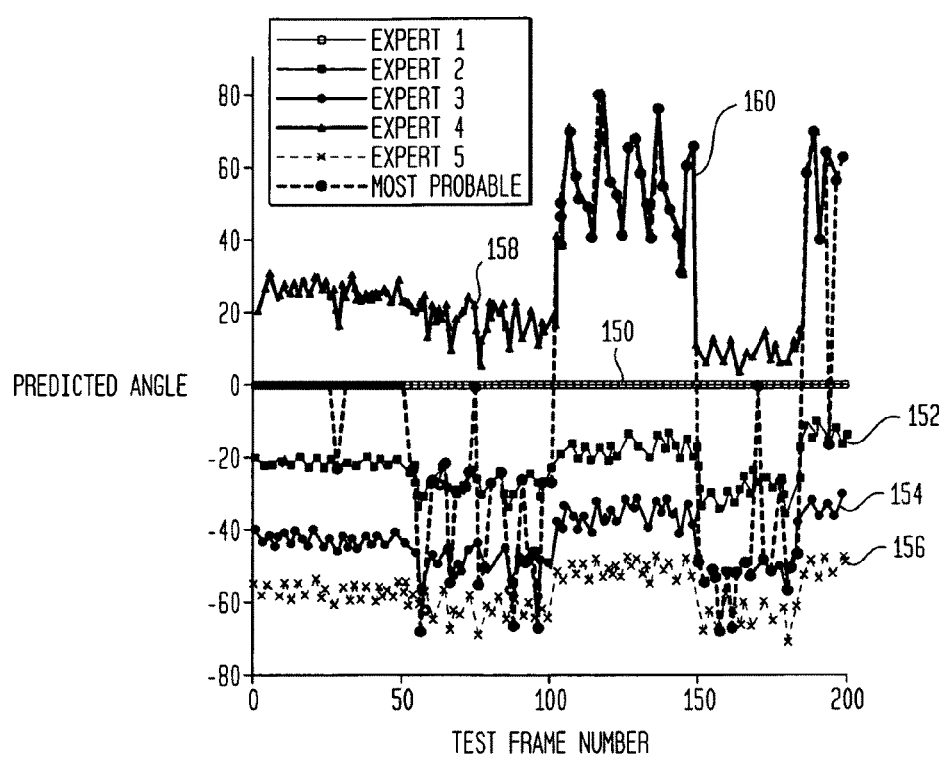
Figure 11:
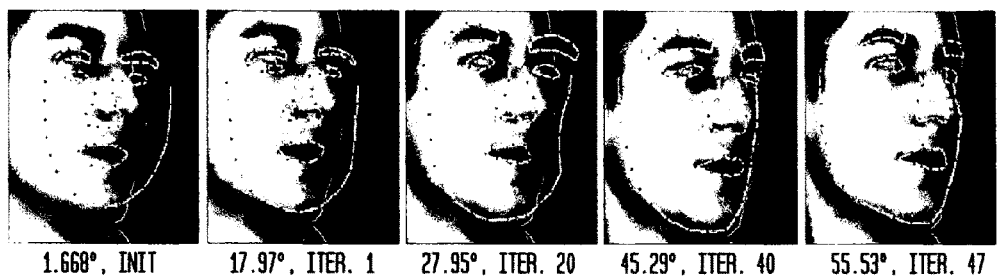
FIG. 11 shows pose angle estimates produced by the present invention in connection with a series of images.

FIGS. 10A-10C illustrate the ME fitting to the multimodal data, to allow for pose angle estimation. ME incorporates pose angles information to cluster the shapes based on similarity between the aligned shapes and generates meaningful clusters that are based on pose variations. The gating network discriminatively classifies the data set into multiple classes. The overlapping subspaces are learned directly from the clusters. A non-linear test dataset was generated from the inverse mapping x=y+0.3 sin(2πy)+ε where ε is zero mean Gaussian noise. Multiple locally learned linear regressors 130 in FIG. 10A gave better predictions compared to a single regressor 132 in FIG. 10A. Shown in FIG. 10B are five shape clusters 140-148 (projected on 2 principle components), which were obtained from the learned gate distribution using ME. The data set contained right frontal head cluster and left head poses. Shown in FIG. 10C is a pose angle prediction on a test data set using 5 experts. The plot 160 indicates the most probable expert of the experts plots 150-158 shown in the graph. Importantly, the most probable expert plot 160 can switch between the different experts 150-158. As such, the experts predict different ranges of pose angles and fit well locally. The results of iteratively fitting (deforming) ASM shapes using clusters obtained from the Mixture of Experts is shown in FIG. 11. The predicted pose angles are labeled with each iteration frame.

Tracking of facial features taken at full profile perspective can also be accomplished by the present invention, where self-occlusion of facial features occurs as a result of the perspective projection. This can be accomplished by allowing the landmark points to lie along the boundary of the features of the face. The plausible shape space remains continuous in this case. The pose angle prediction allows for identification of the clusters which are at full profile (i.e., clusters with pose angles in the range of 90°±10°). For the full profile image search, local intensity is not matched along the normals for the occluded landmarks.

Figure 12:
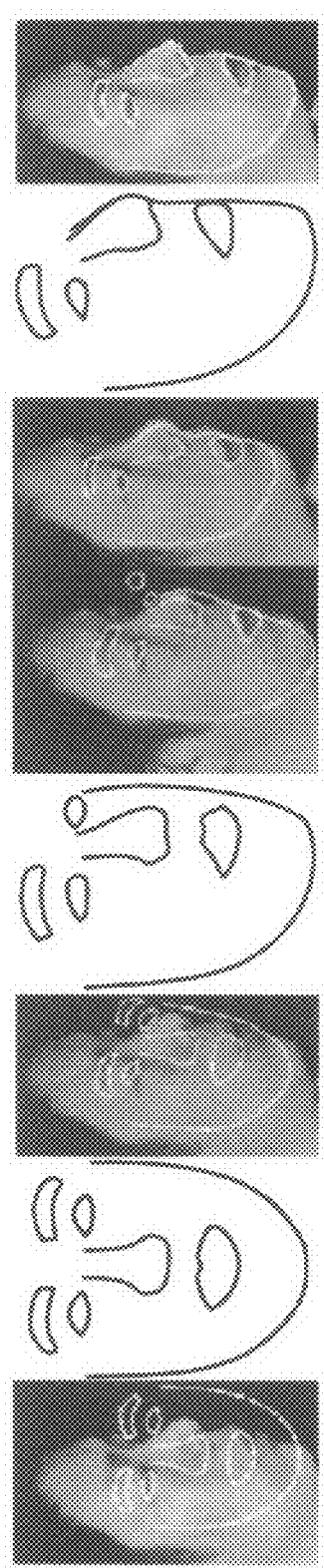
FIG. 12 shows detection and shape alignment of facial features by the present invention in an image having a fill-profile perspective view of head.

FIG. 12 shows the shape detection and alignment results generated by the present invention in a full-profile image. Occluded landmarks are shown as points. Shape fitting results on a full profile pose are initialized with the average frontal shape. The image frames shown correspond to iterations 1, 16, 74, 94 and 114 of level 4 of the Gaussian pyramid. The initial average shape occurs in Cluster 1. Cluster switches occur during iterations 74 and 94.

Figure 13:
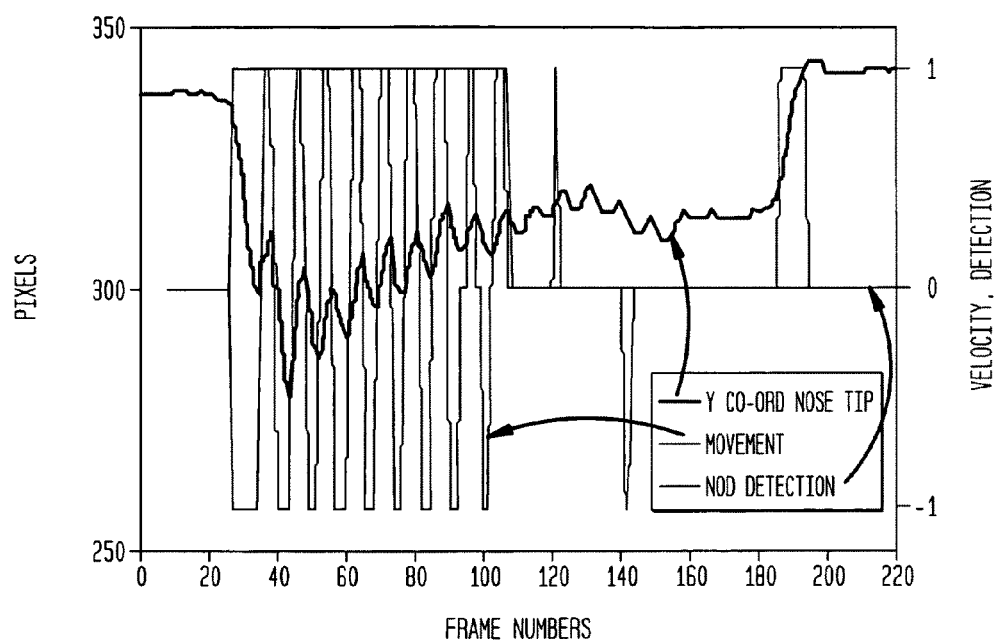
FIG. 13 is graph showing nod and head movement detection of a subject in a video performed by the present invention.

FIG. 13 is a graph showing frame numbers and pixel counts generated by the present invention, which can be used to detect when a person nods. Nod detection, as well as head shaking, can be detected by tracking the X (horizontal) and Y (vertical) coordinates of the subject's nosetip, which can be approximated using the detected nose feature points. Changes in X and Y coordinates of such a landmark are indicative of head shaking and/or nodding. The traces shown in FIG. 13 illustrate detection of head movement and nodding through analysis of pixel positions across frame numbers.

Figure 14:
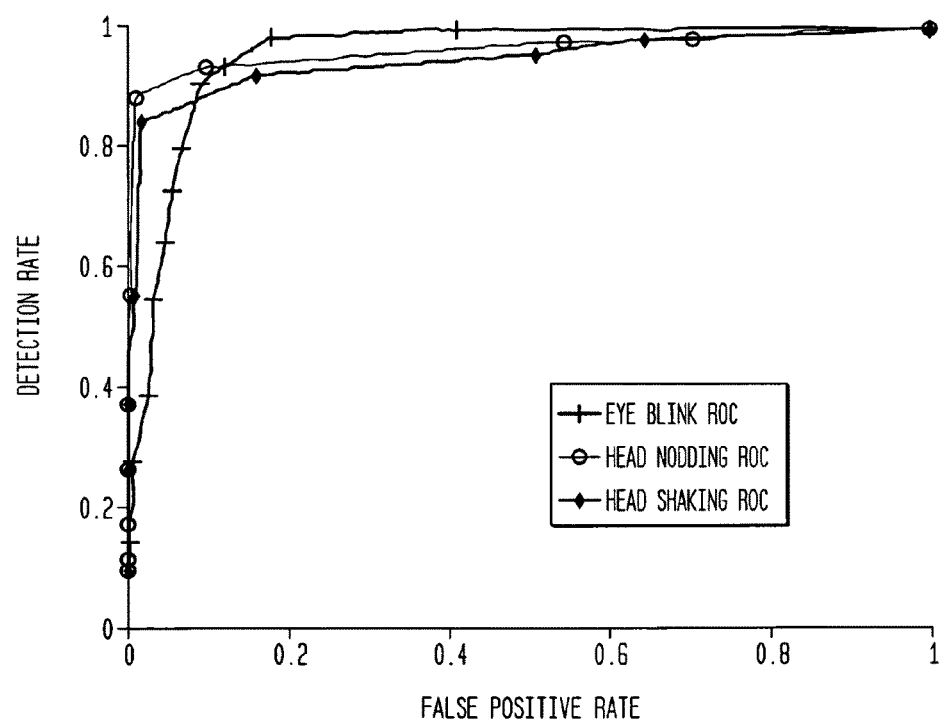
FIG. 14 is a graph showing false positive rates of eye blinking, head nodding, and head shaking detection performed by the present invention.

FIG. 14 is a graph showing a template matching technique according to the present invention for detecting eye blinking of a subject. Eye blinking can be detected by identifying a feature corresponding to a person's eye (e.g., utilizing an appearance histogram of a region around the eye of a subject), and comparing the feature to learned appearance templates (ROC curves) of open and closed eyes. If the feature matches a closed eye template, blinking can be indicated. The templates can be directly learned for the subject using first few frames of the tracked results. The appearance templates can be obtained by varying the thresholds in the detection algorithm. Detection rates and corresponding false positive rates are graphed in FIG. 14 for eye blinking ROC curves, head nodding ROC curves, and head shaking ROC curves.

It is also noted that the present invention could also be modified to compensate for subjects wearing glasses and variations in illumination of the subject using more discriminative appearance models for each landmark and using the appropriate training data with more clusters. The invention can further be applied to detect an individual's expression and/or intent across large head movements by analyzing the shape and appearance of the facial features. The present invention can be utilized to detect and track not only facial features, but any desired feature shapes in a sequence of images where the motion of the subject causes the shapes to undergo large non-linear variations. The present invention could be implemented using any suitable computing hardware and software components, and can operate with an imaging device, such as a video camera.

Having thus described the invention in detail, it is to be understood that the foregoing description is not intended to limit the spirit or scope thereof. What is desired to be protected by Letters Patent is set forth in the appended claims.

What is claimed is:

1. A method for detecting and tracking a feature in an image, comprising the steps of:
    obtaining a set of training images clustered into clustered shape subspaces representative of at least one non-linear shape manifold in the training images;
    receiving an image in which identification of a feature in the image is desired and movement of the feature has occurred with respect to a previous image;
    creating an initial shape for identifying the feature in the image;
    searching through the clustered shape subspaces to find a potential matching shape which potentially matches the feature;
    deforming the initial shape into the potential matching shape; and
    continuing searching and deformation until a final shape indicative of the feature is obtained.

2. The method of claim 1, further comprising the step of training a shape model using the clustered shape subspaces.

3. The method of claim 2, wherein the step of training the shape model further comprises aligning two-dimensional planar shapes in a global tangent space to cluster the clustered shape subspaces.

4. The method of claim 3, wherein the step of training the shape model further comprises aligning the two-dimensional planar shapes using Procrustes analysis to produce a plurality of aligned shapes.

5. The method of claim 4, wherein the step of training the shape model further comprises clustering the plurality of aligned shapes into a plurality of clusters ensuing an Expectation-Maximization algorithm.

6. The method of claim 5, wherein the step of training the shape model further comprises generating linear subspaces from the two-dimensional planar shapes.

7. The method of claim 6, wherein the step of training the shape model further comprises learning locally linear point distribution models using Principal Component Analysis within each of the clustered shape subspaces.

8. The method of claim 7, wherein the step of training the shape model further comprises learning intensity profile models for each landmark for each of the clustered shape subspaces.

9. The method of claim 8, wherein the step of training the shape model further comprises deriving multivariate Gaussian mixture density distributions from the intensity profile models.

10. The method of claim 2, wherein the step of deforming the initial shape comprises deforming the initial shape using the shape model.

11. The method of claim 1, wherein the step of searching further comprises assigning an initial cluster to an average shape based upon a mahalanobis distance between the average shape and cluster centers in a global tangent space of the clustered shape subspaces.

12. The method of claim 11, wherein the step of searching further comprises searching through intensity profile models for an intensity profile that maximizes mixture density probability to create an intermediate shape.

13. The method of claim 11, wherein the step of deforming the initial shape further comprises constraining the deformation of the shape to match at least one of the clustered shape subspaces to produce an intermediate shape.

14. The method of claim 13, wherein the step of searching comprises assigning a new cluster shape space to the intermediate shape by finding a nearest cluster based on a mahalanobis distance.

15. The method of claim 14, wherein the step of searching comprises projecting the intermediate shape onto a local tangent space at a cluster mean shape.

16. The method of claim 1, further comprising tracking the feature across a plurality of subsequent images wherein the feature moves relative to frames of the subsequent images.

17. The method of claim 16, wherein the step of tracking the feature further comprises tracking the feature across the clustered shape subspaces in consecutive frames using a sum of squared intensity difference (SSID) tracker.

18. The method of claim 17, wherein the step of tracking the feature further comprises re-initializing points which have lost track by searching along a normal and maximizing profile mixture densities.

19. The method of claim 18, wherein the step of tracking the feature further comprises constraining a subsequent shape indicative of the feature to lie on a shape manifold within the subsequent images.

20. The method of claim 1, further comprising estimating a pose angle of a subject in the target image by learning Mixture of Experts models for the shapes and using the feature shapes to predict pitch and yaw of the head.

* * * * *